United States Patent
Baynard et al.

[11] Patent Number: 6,007,042
[45] Date of Patent: Dec. 28, 1999

[54] FLY ROD AND REEL HOLDER

[76] Inventors: D. Calvin Baynard, Rte. 7, Box 1444, Manning, S.C. 29102; David Baynard, Rte. 1, Box 1407H, Alcolu, S.C. 29001

[21] Appl. No.: 09/048,670

[22] Filed: Mar. 26, 1998

Related U.S. Application Data
[60] Provisional application No. 60/052,967, Jul. 18, 1997.

[51] Int. Cl.⁶ .................................................. A01K 97/10
[52] U.S. Cl. ........................................... 248/535; 248/515
[58] Field of Search ................................ 248/515, 176.1, 248/316.1, 535, 514, 512, 520, 534, 538, 540, 541, 298.1, 316.8; 211/70.8; 43/21.2

[56] References Cited

U.S. PATENT DOCUMENTS

| | | | |
|---|---|---|---|
| D. 345,409 | 3/1994 | Baynard | D22/147 |
| 473,073 | 4/1892 | LeMaire | 248/535 |
| 1,084,966 | 1/1914 | Rodes | 248/404 |
| 2,416,828 | 3/1947 | Hamre | 248/515 |
| 2,452,116 | 10/1948 | Felton | 248/514 |
| 2,472,059 | 6/1949 | Arwood | 248/515 |
| 2,499,821 | 3/1950 | Geisheimer | 43/21.2 |
| 2,522,255 | 9/1950 | Climo | 43/21.2 |
| 2,523,356 | 9/1950 | Cherry | 43/21.2 |
| 2,564,625 | 8/1951 | Jackson et al. | 43/21.2 |
| 2,566,496 | 9/1951 | Montano | 248/514 |
| 2,604,287 | 7/1952 | Robbins et al. | 248/540 |
| 2,645,439 | 7/1953 | Gauthier | 248/513 |
| 2,900,152 | 8/1959 | Hahn | 248/515 |
| 3,162,970 | 12/1964 | Gould | 43/21.2 |
| 3,934,801 | 1/1976 | Johnson | 248/515 |
| 4,063,704 | 12/1977 | Rother | 248/515 |

*Primary Examiner*—Ramon O. Ramirez
*Assistant Examiner*—Anita M. King
*Attorney, Agent, or Firm*—Cort Flint

[57] ABSTRACT

A fishing rod holder for holding a fly rod and reel is disclosed, the rod having a reel seat to which the reel is attached, the reel having a reel bracket for attachment to the reel seat. A first width is defined between spaced points of attachment of the bracket to the reel seat, and a second width is defined generally between spaced intersection points where the bracket and a circumference of the reel intersect to define a crevice. The holder comprises a standard for attachment to an associated structure; and a rod and reel support cradle carried by the standard having a pair of spaced cradle arms; the cradle including an open cradle top, and an open cradle side providing a space for receiving the reel. A cradle bottom receives the rod and reel in a holding position wherein a first distance between the cradle arms near the cradle bottom is less than the reel diameter and generally greater than the second width of the bracket to fit within the crevice.

29 Claims, 7 Drawing Sheets

FIG. 3

FLY ROD AND REEL HOLDER

This application claims benefit of provisional application Ser. No. 60/052,967 filed Jul. 18, 1997.

BACKGROUND OF THE INVENTION

This invention relates to a fishing rod holder, and more particularly to a holder for a fly rod and reel which may be attached to an associated structure such as a boat rail, fishing dock and the like.

Heretofore, various rod holders have been proposed for various types of fishing rods. Typically the rod holder includes a standard for attachment to the associated structure, and a cradle carried by the standard which supports the fishing rod in a fishing position, i.e., a generally horizontal, slightly inclined, position. The cradle often consists of a pair of spaced arms carried by the standard in the form of a fork with hooks on the free ends. Typically the butt of the rod would be held under one of the hooks and rest in the other hook.

While the prior fishing rod holders have been suitable for their intended use, a suitable rod holder for a fly rod and reel, or a suitable holder for tightly gripping a fishing reel while secured to a rod, has not been heretofore provided.

Accordingly, an important object of the present invention appears to provide a rod holder which may be affixed to an associated structure for securely holding a fly rod and reel.

Another object of the present invention is to provide a rod holder for a fly rod and reel which may be attached to a boat and securely hold the fly rod and reel during travel, particularly over rough water in a secure position.

Another object of the present invention is to provide a rod holder which may be attached to an associated structure for securely holding a fly rod and reel which allows the fly rod to be easily inserted into the rod holder and quickly removed.

Yet another object of the invention is to provide a rod holder which securely grips a reel of a fishing rod.

Still another object of the present invention is to provide a rod holder which may be adjusted to accommodate a variety of fishing reel sizes and types.

SUMMARY OF THE INVENTION

The above objectives are accomplished according to the present invention by providing a fishing rod holder for holding a fly rod and reel, and the like, by which the reel is secured by cradle arms of the holder. Typically, a fly rod has a reel seat to which the reel is attached, and the reel has a reel bracket for attachment to the reel seat. The reel bracket attached to the reel seat has a first width between spaced points of attachment to the reel seat, and a second width between spaced inter-section points where the bracket and a circumference of the reel intersect. In accordance with the invention, the holder comprises a standard for attachment to an associated structure. A rod and reel support cradle is carried by the standard having a pair of spaced cradle arms. The cradle includes an open cradle top, and an open cradle side providing a space for receiving the reel. A cradle bottom receives the rod and reel in a holding position. There is a first distance between the cradle arms near the cradle bottom which is less than the reel diameter and generally greater than the second width of the bracket whereby the reel is secured held between the cradle arms. Advantageously, the first distance between the cradle arms is slightly greater than the second width of the bracket. There is a second distance between the cradle arms near the cradle top which is greater than the first distance between the cradle arms near the cradle bottom to define a wider reel receiving space having a greater width than at the cradle bottom so that the cradle bottom securely engages the reel bracket in a set holding position to securely hold and retain the rod and reel therein.

Preferably, the cradle arms taper downwardly from the cradle top toward the cradle bottom to define the wide reel receiving space. The cradle arms also taper rearwardly to define the wide reel receiving space. The cradle may be inclined forwardly with respect to the standard. An attachment is provided for securing said standard to the associated structure.

In an advantageous form of the invention, a fishing rod holder is provided having a support cradle with a first and second spaced cradle arms wherein the reel receiving space between the arms may be adjusted. An adjustable mount is provided for mounting at least one of the first and second cradle arms in the support cradle so that a longitudinal distance between the cradle arms may be adjusted to receive the reel in a manner that the reel is clamped and secured between the arms. Preferably, the adjustable mount includes a longitudinal adjustment mechanism for adjusting the longitudinal distance between said cradle arms, and a rotational adjustment element for adjusting a rotational position of said cradle arms independently of each other. The longitudinal adjustment mechanism includes a first longitudinal adjustment element for adjusting the longitudinal position of the first cradle arm, and a second longitudinal adjustment element for adjusting the longitudinal position of the second cradle arm.

Advantageously, the first longitudinal adjustment element is connected to the first cradle arm and includes a threaded cross-piece threaded into a stationary mount. The second longitudinal adjustment element includes a second cross-piece threaded into an opposing end of the stationary mount. Lock nuts are carried by the cross-pieces for locking the threaded cross-pieces in a longitudinal position as well as a rotational position relative to the stationary mount.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
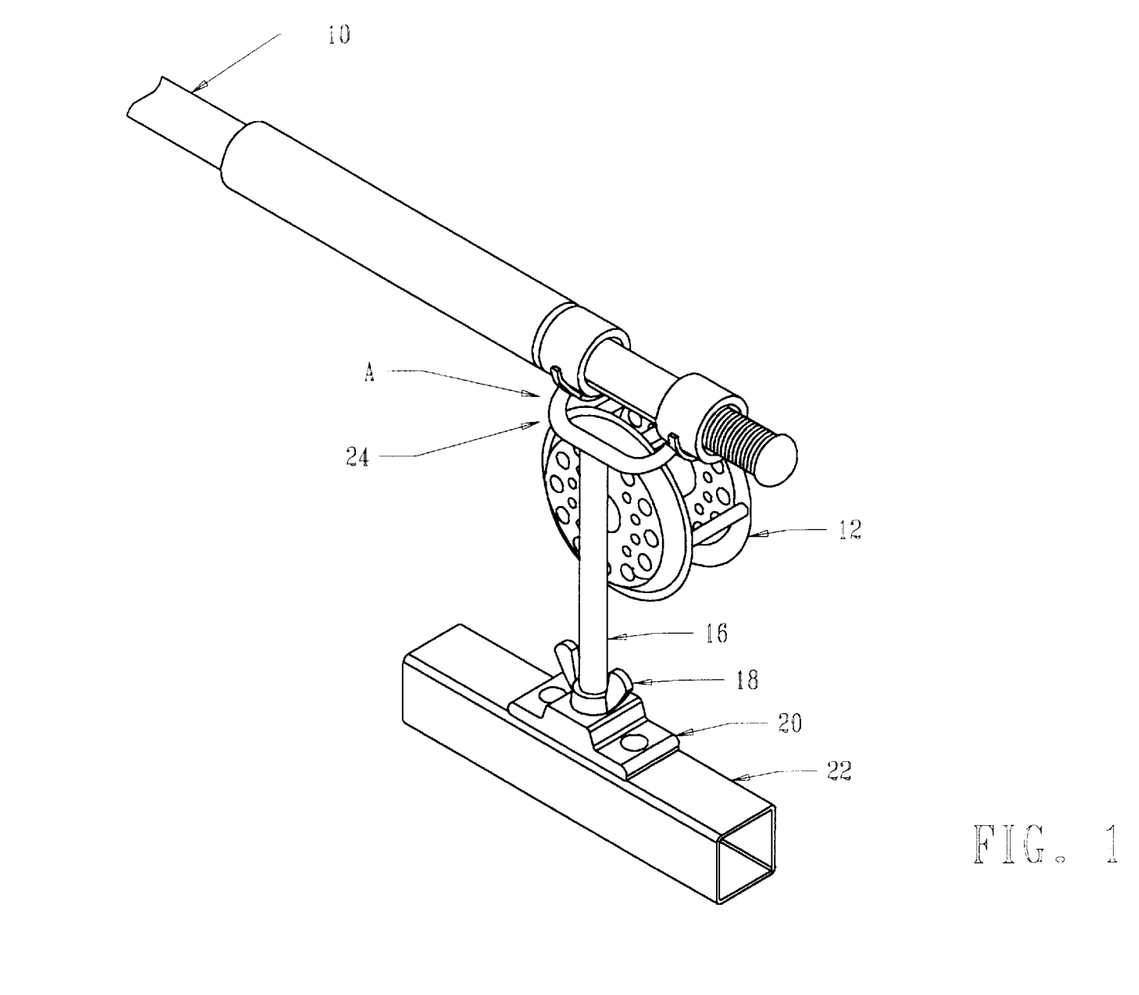
FIG. 1 is a prospective view of a fly rod and reel holder constructed in accordance with the present invention attached to an associated structure.

As can best be seen in FIG. 1, a fishing rod holder, designated generally as A is illustrated holding a fly rod 10 and reel 12 which is attached to an associated structure. Holder A comprises a standard 16 having a threaded end 16a (FIG. 2) and a lock nut 18 for securing the holder to a mounting block 20 secured to a boat rail 22 or other associated structure.

Figure 2A:
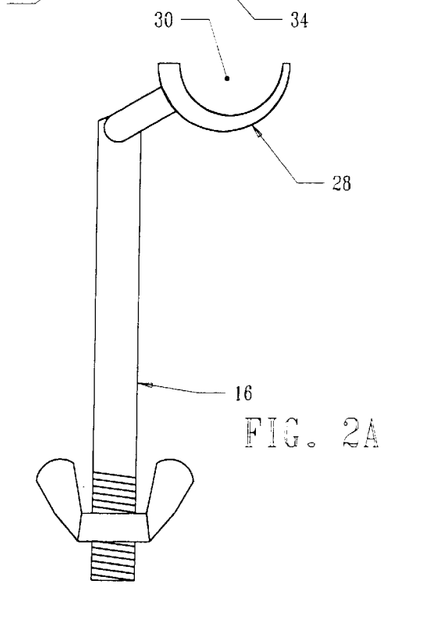
FIG. 2A is an end elevation of the holder of FIG. 2.
Figure 2B:
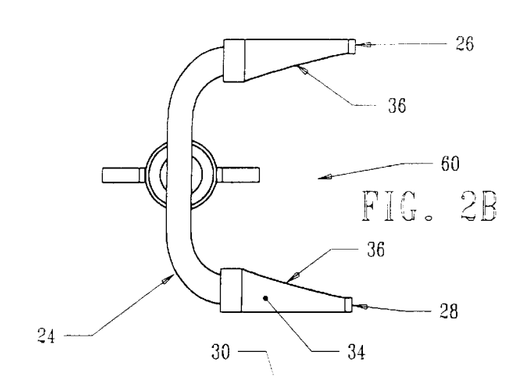
FIG. 2B is a top plan view of the holder of FIG. 2.
Figure 2C:
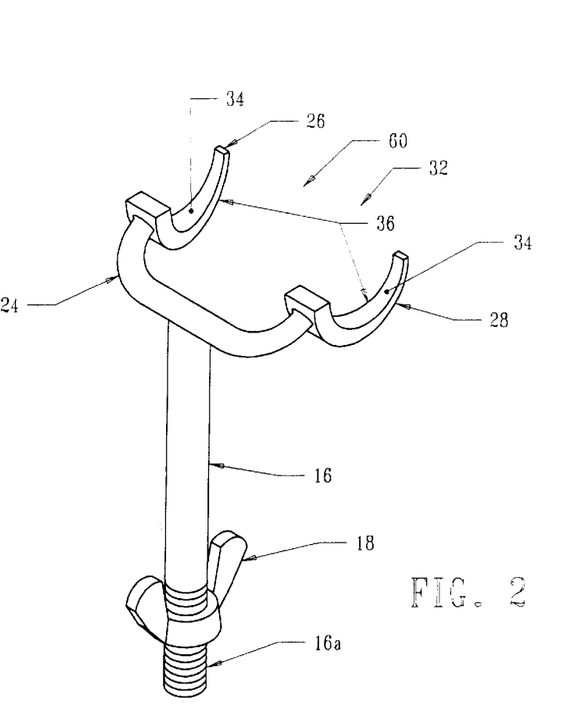
FIG. 2 is a prospective view of a fly rod and reel holder constructed according to the present invention.
Figure 3:
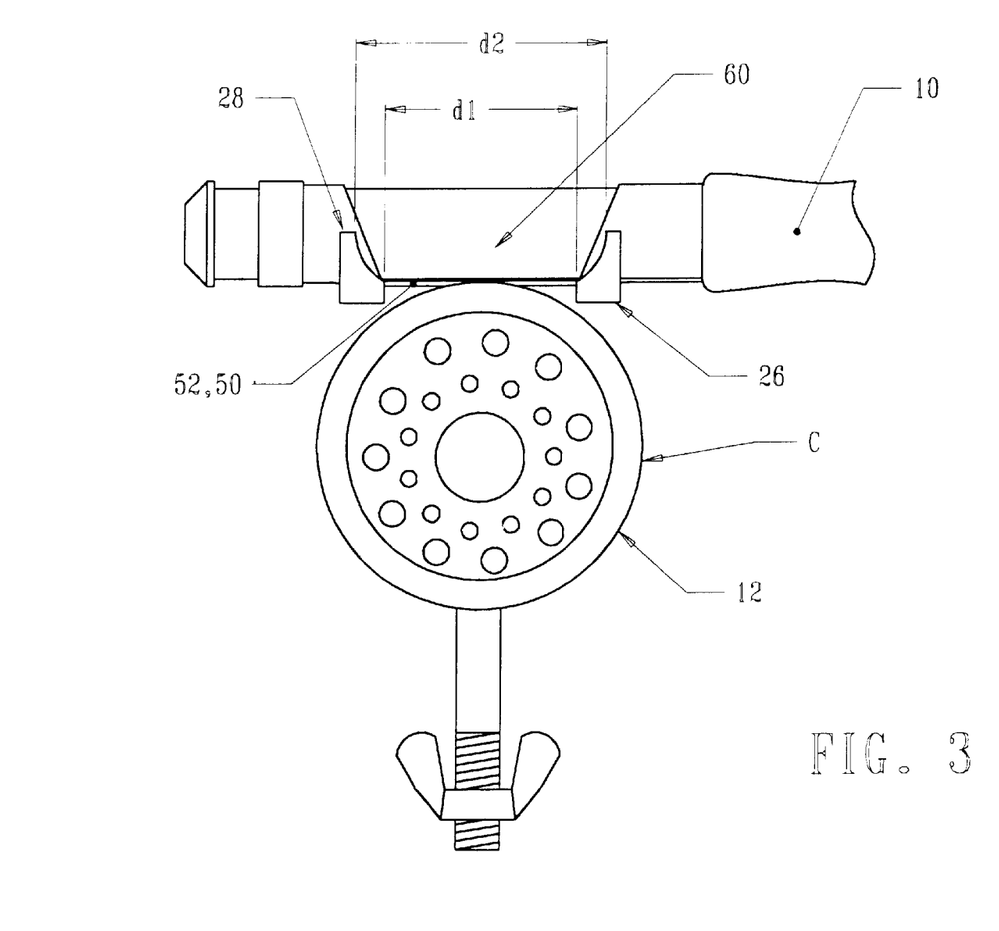
FIG. 3 is a side elevation of a fly rod and reel holder according to the present invention with a fly rod and reel carried by the holder.
Figure 4A:
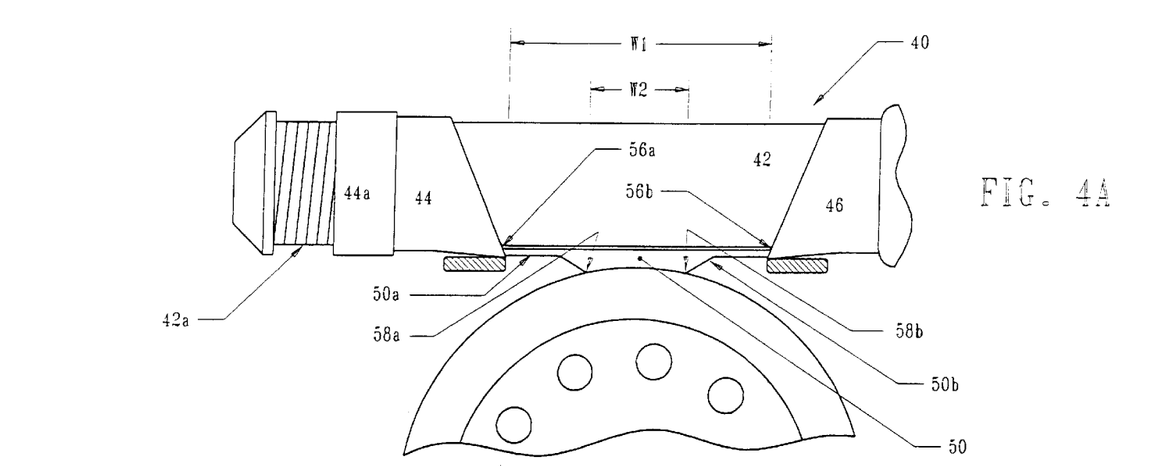
FIG. 4A is a partial sectional view illustrating another type of rod and reel held on a holder according to the invention.
Figure 4B:
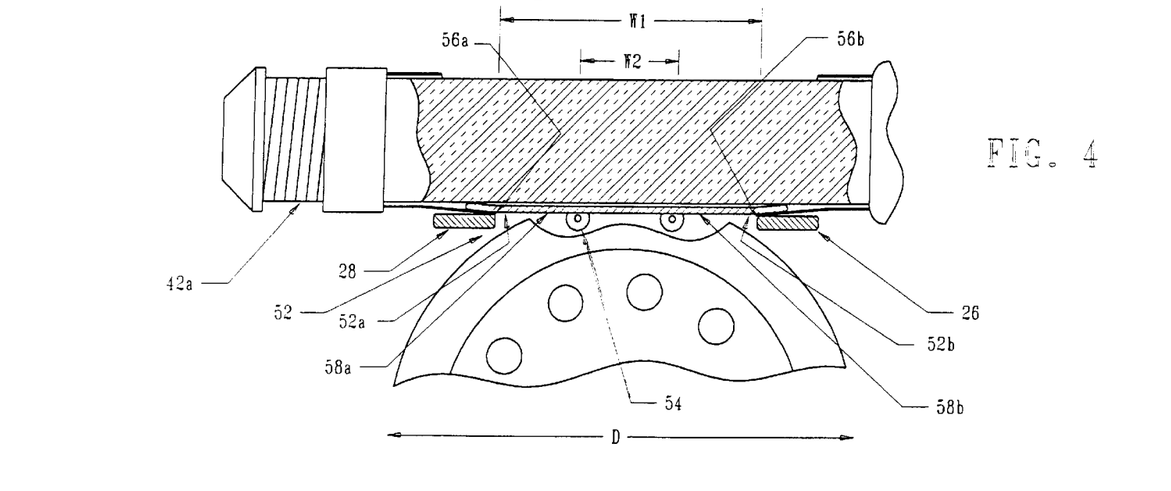
FIG. 4 is a sectional view showing a fly rod and reel as held on a holder according to the invention.

Referring now to FIGS. 2 through 4, the holder will be described in more detail. A rod and reel support cradle, designated generally as 24, is carried by an upper portion of standard 16. The support cradle includes a pair of spaced cradle arms 26 and 28. The cradle includes an open cradle top 30 and an open cradle side 32 providing an entrance for receiving reel 12 carried by rod 10. Cradle arms 26 and 28 include a downward and inward taper 34 which tapers outwardly from the cradle top toward the cradle bottom. The cradle arms include a second taper 36 which tapers rearwardly and inwardly from the front to the rear of the cradle. Tapers 34 and 36 define a wide reel receiving space 60 which has a greater width at the cradle top and at the cradle bottom for easily receiving the reel and allowing it to drop downwardly to a holding position, as can best be seen in FIGS. 5 and 5a.

Referring to FIGS. 3 and 4, it can be seen that the fly rod has a reel seat, designated generally as 40, which carries reel 12. Reel seat 40 includes a butt portion 42 of the rod and a pair of clamps 44 and 46 which receive and clamp opposing ends of a reel bracket, designated generally as 50. Clamp 44 moves longitudinally by means of a threaded operator 44a which travels on threads 42a of rod butt 42 (FIGS. 4, 4A).

As can best be seen in FIGS. 3–4, reel 12 includes bracket 50 which has opposing legs 50a and 50b, which fit in clamps 44. Other versions of reels may have a different reel bracket (FIG. 4) wherein the bracket legs 52a and 52b are formed by a fairly planar strip of metal secured to the reel by weldments and rods 54. In either case, a first width w1 is defined between space points of attachment 56a and 56b where the reel bracket attaches to clamps 44 rod butt 42. A second width w2 is defined between spaced intersection points 58a and 56b where the outer circumference "C" of the reel intersects either reel bracket 50, 52, as can best be seen in FIGS. 4 and 4A, to create a crevice. In order to secure the rod and reel in a holding position on the rod holder A, the cradle arms are spaced a first distance d1 near the cradle bottom which is less than the diameter of the reel "D," and the distance d1 is generally greater than the width w2 of the bracket 50, 52. By this means, the cradle arms near the cradle bottom are wedged tightly in the crevice of the opposing intersection points to snugly hold the reel in place. The reel cannot bounce up and down and become dislodged from the holder. Likewise, a second distance d2 is defined between opposing ends of the cradle arms near the cradle top. The cradle arms taper outwardly from the distance d1 to the distance d2 to define the wide cradle receiving space, designated generally as 60 (FIG. 2B, FIG. 3). Preferably, distance d1 is greater than the width w2 of the reel bracket. Preferably, the cradle is carried so that it is inclined forwardly tilting the rod tip downwardly exerting pressure on the reel 12 tight against the cradle bottom for a secure holding position.

Figure 5:
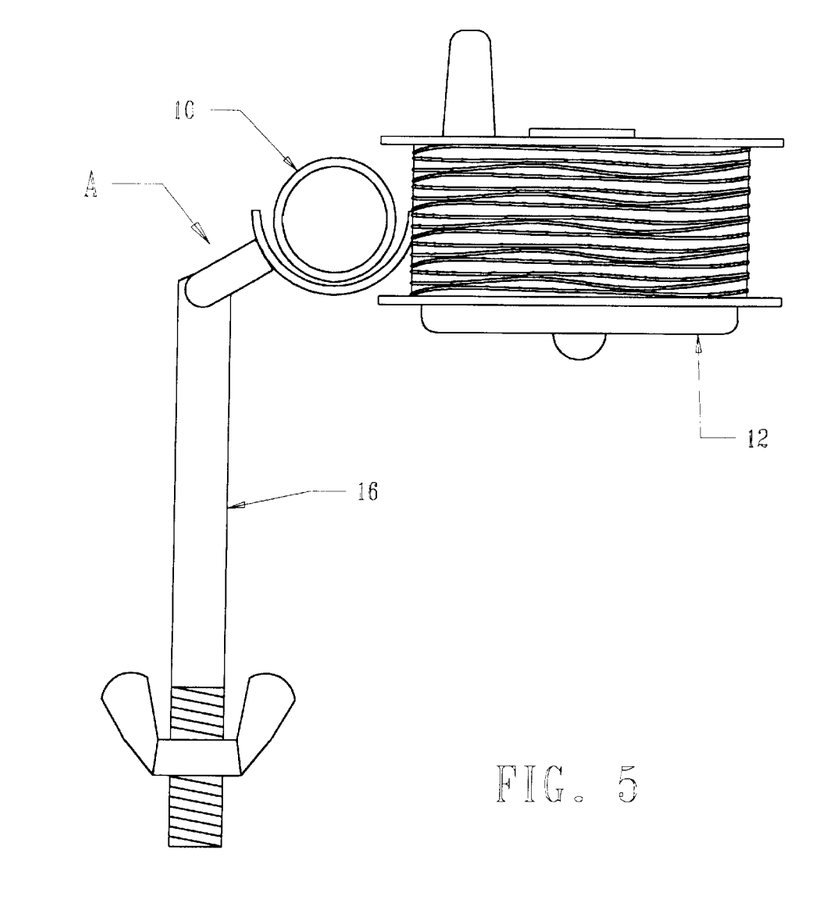
FIG. 5 is an end illustration illustrating a fly rod and reel being placed on a holder according to the invention.
Figure 5A:
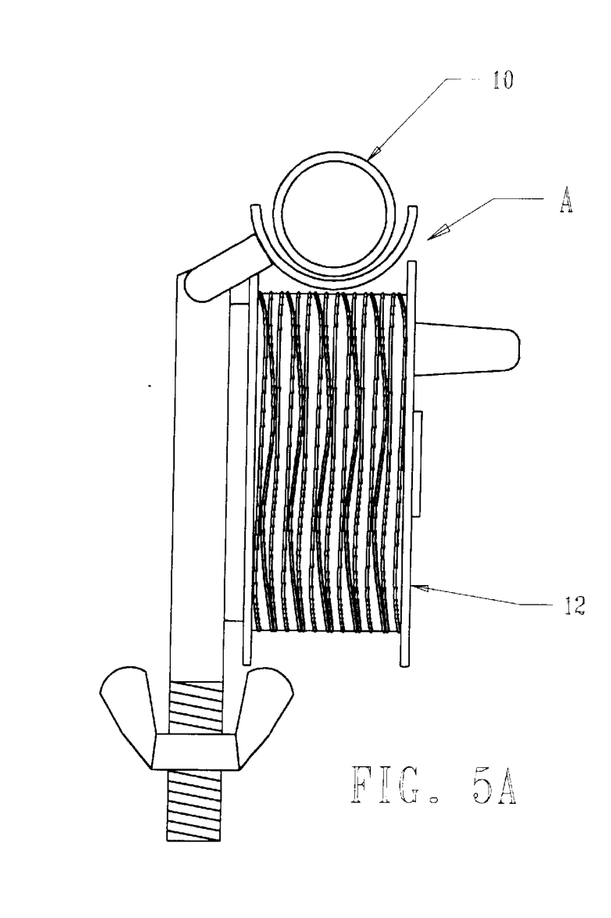
FIG. 5A is an end view with the fly rod and reel in place on the rod holder.

As can best be seen in FIGS. 5 and 5A, the fly rod and reel are placed in the cradle with the reel in a horizontal position (FIG. 5), and then the reel is allowed to drop and wedge tightly between cradle arms 26 and 28 in the rod holding position (FIG. 5A). As best can be seen that a highly advantageous construction can be had for a rod holding device wherein a fly rod and reel are securely held in a holding position by a rod holder that can be mounted to a boat or a stationary structure. In the case of a boat, the rod is held in a sufficiently secure holding position that the boat may travel across the water, even when rough, and the rod is held in place.

Figure 6:
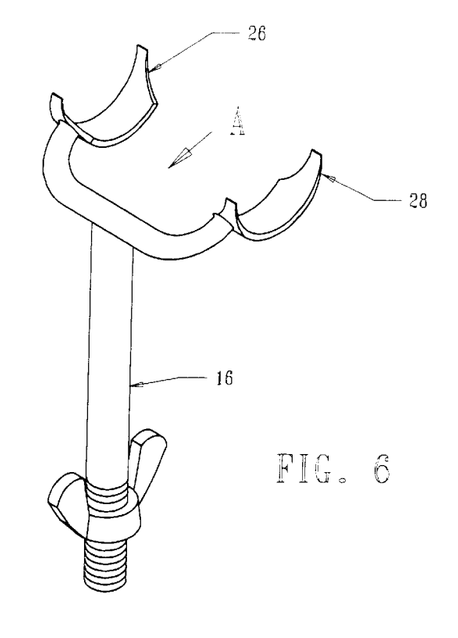
FIG. 6 is a prospective view of an alternate embodiment of the fly rod and reel holder according to the invention.
Figure 6A:
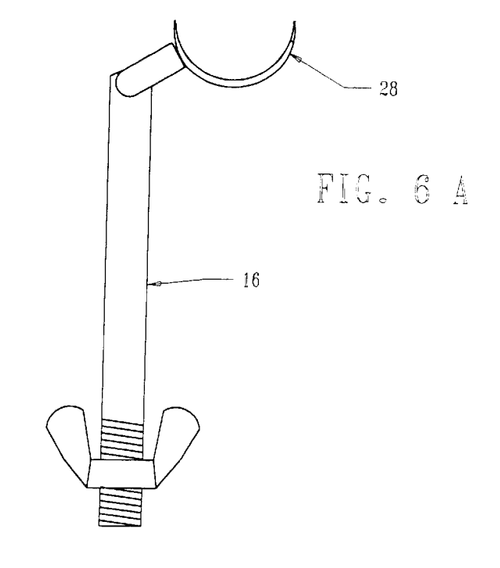
FIG. 6A is an end view of the holder of FIG. 6.
Figure 6B:
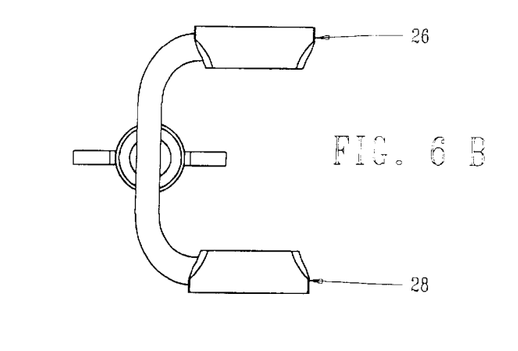
FIG. 6B is a top plan view of the holder of FIG. 6.

FIG. 6B discloses an alternate embodiment of the present invention of a fly rod and reel holder A' having longitudinally spaced cradles 26', 28' supported by a standard 16' wherein the curvature of the cradle arms 26' and 28' is varied according to the invention.

Figure 7:
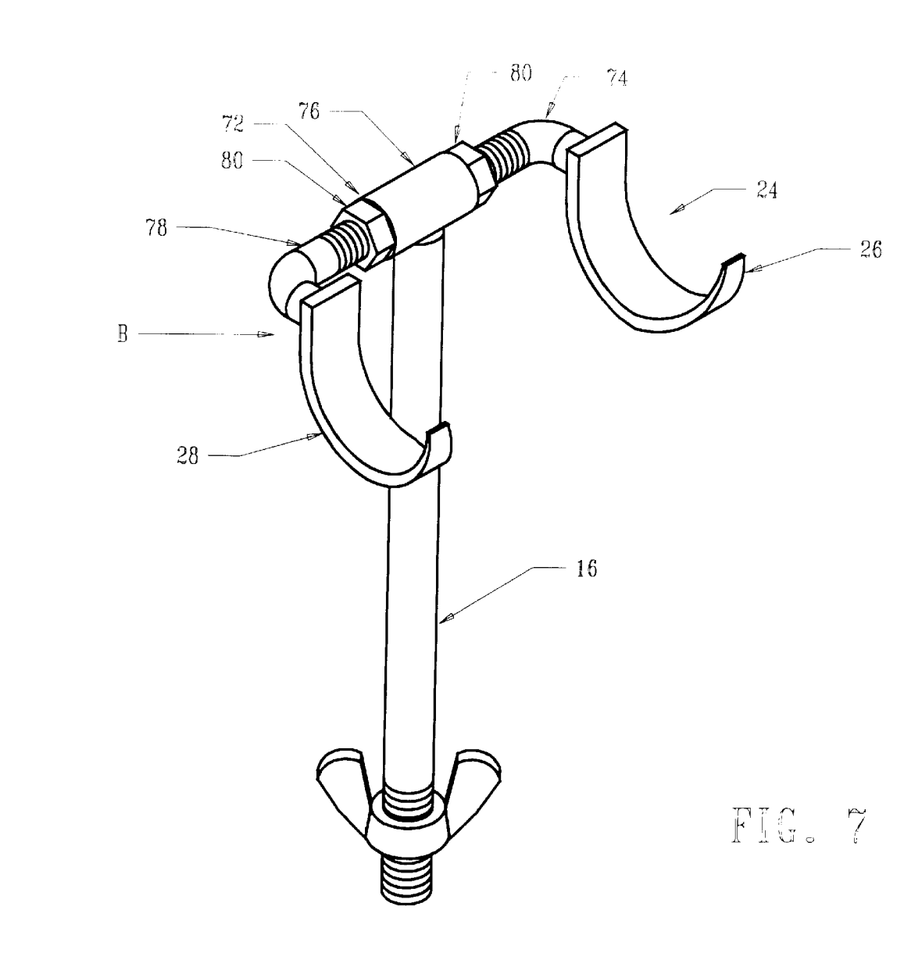
FIG. 7 is a perspective view of an embodiment of the invention wherein the spacing between the cradle support arms may be adjusted to accommodate different types and sizes of fishing reels.

FIG. 7 illustrates an embodiment of the invention wherein a rod holder B includes an adjustable mount 72 having a first longitudinal adjustment element 74 connected to first cradle arm 26 which includes a threaded cross-piece threaded into a stationary element 76. There is a second longitudinal adjustment element 78 connected to second arm 28 having a second cross-piece threaded into an opposing end of the stationary element. Lock nuts 80 are provided for locking the threaded cross pieces in a longitudinal position as well as a rotational position relative to the stationary mount 76. By loosening the lock nuts, the threaded cross-pieces may be turned left or right to move the cradle arms closer or farther apart. If desired, only one of the arms may be movable, and still provide this space adjustment. This allows the spacing between the cradle support arms of the rod holder to be adjusted to securely hold various types and sizes of reels. Adjustment of the rotational arm position allows the reel to be tilted rather than vertical when held. It is also noted that the adjustable mount allows easy removal of the reel and rod from the holder. While only one threaded cross-piece is needed for adjustment of the spacing and may be provided, it has been found that the provision of two cross-pieces allows for them to be interchanged to provide a left hand or right hand (shown) fishing rod holder.

While a preferred embodiment of the invention has been described using specific terms, such description is for illustrative purposes only, and it is to be understood that changes and variations may be made without departing from the spirit or scope of the following claims.

What is claimed is:

1. A fishing rod holder for holding a fly rod and reel, said rod having a reel seat to which said reel is attached, said reel having a reel bracket for attachment to said reel seat, a first width being defined between spaced points of attachment of said bracket to said reel seat, and a second width being defined generally between spaced intersection points where said bracket and a circumference of said reel intersect to define a crevice, wherein said holder comprises:

a standard for attachment to an associated structure;

a rod and reel support cradle carried by said standard having a pair of longitudinally spaced cradle arms spaced along a longitudinal axis of the rod to be held;

said cradle including an open cradle top, and an open cradle side providing an entrance for receiving said reel, and a cradle bottom for receiving said rod and reel in a holding position;

a first distance between said cradle arms near said cradle bottom being less than said reel diameter and generally greater than said second width of said bracket when said rod and reel are received in said holding position so that said cradle arms fit generally within said crevice.

2. The rod holder of claim 1 wherein said first distance between said cradle arms is slightly greater than the second width of said bracket.

3. The rod holder of claim 2 including a second distance between said cradle arms near said cradle top which is greater than said first distance between said cradle arms near said cradle bottom to define a reel receiving space having a greater width than at said cradle bottom so that said cradle bottom securely engages at least one of said reel bracket and reel diameter in a set holding position to securely hold and retain said rod and reel when said rod and reel are placed in said holder.

4. The rod holder of claim 1 including a second distance between said cradle arms near said cradle top which is greater than said first distance between said cradle arms near said cradle bottom to define a wide reel receiving space having a greater width at said cradle top than at said cradle bottom so that said bracket is securely engaged by said cradle arm in a set holding position to securely hold and retain said rod and reel therein.

5. The rod holder of claim 4 wherein said cradle arms taper downwardly from said cradle top toward said cradle bottom to define said wide reel receiving space.

6. The rod holder of claim 5 wherein said cradle arms taper rearwardly to define said wide reel receiving space.

7. The rod holder of claim 1 wherein said cradle is inclined forwardly with respect to said standard.

8. The rod holder of claim 1 including an attachment for securing said standard to said associated structure.

9. The rod holder of claim 1 wherein said support cradle includes an adjustable mount mounting at least a first of said cradle arms in said support cradle so that a longitudinal distance between said cradle arms may be adjusted.

10. The rod holder of claim 9 wherein said adjustable mount includes a longitudinal adjustment mechanism for adjusting the longitudinal distance between said cradle arms, and a rotational adjustment element for adjusting a rotational position of said cradle arms.

11. The rod holder of claim 9 wherein said adjustable mount includes a longitudinal adjustment mechanism having a first longitudinal adjustment element for adjusting the longitudinal position of said first cradle arm, and a second longitudinal adjustment element for adjusting a longitudinal position of a second of said cradle arms.

12. The rod holder of claim 11 including a rotational adjustment mechanism for adjusting the rotational position of said first and second cradle arms independently of each other.

13. The rod holder of claim 12 wherein said first and second longitudinal adjustment elements include first and second threaded cross-pieces threaded into a stationary mount, and lock nuts carried by said cross-pieces for locking the threaded cross-pieces in a longitudinal position as well as a rotational position relative to the stationary mount so that the rod holder securely holds said reel while allowing easy removal of the reel and rod from the holder.

14. The holder of claim 13 wherein said cross-pieces are interchangeable with each other so that said arms may be located on either a right side or a left side of said standard to provide a left-hand or a right-hand holder, respectively.

15. The holder of claim 9 wherein said adjustable mount mounts said cradle arms on either a right side or a left side of said standard to provide a left-hand or a right-hand holder, respectively.

16. A fishing rod holder for holding a rod and reel, said rod having a reel seat to which said reel is attached by a reel bracket carried by said reel, said rod holder comprising;

a standard for attachment to an associated structure;

a support cradle for supporting said rod and reel carried by said standard;

said support cradle including a first cradle arm and a second cradle arm, said first and second cradle arms being longitudinally spaced from one another along a longitudinal axis of the reel to be held to receive said reel there between;

at least one of said cradle arms being open for receiving said rod when said reel is secured between said first and second cradle arms; and an adjustable mount mounting at least one of said first and second cradle arms in said support cradle so that a longitudinal distance between said cradle arms may be adjusted to fit a diameter of said reel in a manner that said reel is secured between said arms when supported by said holder.

17. The rod holder of claim 16 wherein said adjustable mount includes a longitudinal adjustment mechanism for adjusting the longitudinal distance between said cradle arms, and a rotational adjustment element for adjusting a rotational position of said cradle arms.

18. The rod holder of claim 17 wherein said rotational adjustment mechanism adjusts the rotational position of said first and second cradle arms independently of each other.

19. The rod holder of claim 17 wherein said longitudinal adjustment mechanism includes a first longitudinal adjustment element for adjusting the longitudinal position of said first cradle arm, and a second longitudinal adjustment element for adjusting the longitudinal position of said second cradle arm.

20. The rod holder of claim 19 including a stationary threaded mount carried by said standard and said first and second longitudinal adjustment elements including threaded cross-members mated with said threaded bore mount.

21. The rod holder of claim 17 wherein said adjustable mount includes a stationary mount, a first longitudinal adjustment element connected to the first cradle arm which includes a threaded cross-piece threaded into said stationary mount, said second longitudinal adjustment element includes a second cross-piece threaded into an opposing end of the stationary mount, and lock nuts carried by said cross-pieces for locking the threaded cross-pieces in a longitudinal position as well as a rotational position relative to the stationary mount so that the rod holder securely holds said reel while allowing easy removal of the reel and rod from the holder.

22. The holder of claim 21 wherein said cross-pieces are interchangeable with each other so that said arms may be located on either a right side or a left side of said standard to provide a left-hand or a right-hand holder, respectively.

23. The holder of claim 16 wherein said adjustable mount mounts said cradle arms on either a right side or a left side of said standard to provide a left-hand or a right-hand holder, respectively.

24. A fishing rod holder for holding a rod and reel, said rod having a reel seat to which said reel is attached, said reel having a reel bracket for attachment to said reel seat, a first width being defined between spaced points of attachment of said bracket to said reel seat, and a second width being defined generally between spaced intersection points where said bracket and a circumference of said reel intersect to define a crevice, wherein said holder comprises:

a standard for attachment to an associated structure;

a rod and reel support cradle carried by said standard having a pair of longitudinally spaced cradle arms spaced along a longitudinal axis of the rod to be held;

said cradle including an open cradle top, and open cradle side providing an entrance for receiving and removing said reel, and a cradle bottom for receiving said rod and reel in a holding position;

a first distance between said cradle arms near said cradle bottom being less than said reel diameter and generally greater than said second width of said bracket when said rod and reel are received in said holding position so that said cradle arms fit generally within said crevices; and said cradle entrance receiving said rod bracket with said reel in a first position whereupon said reel may be rotated about said longitudinal axis to a second position wherein said cradle arms engaged in said opposing crevices to hold said rod and reel, and wherein said reel may again be rotated to said first position for removal of said rod and reel.

25. The rod holder of claim 24 including a second distance between said cradle arms near said cradle top which is greater than said first distance between said cradle arms near said cradle bottom to define a wide reel receiving space having a greater width at said cradle top than at said cradle bottom so that said bracket is securely engaged by said cradle arm in a set holding position to securely hold and retain said rod and reel therein.

26. The rod holder of claim 25 wherein said cradle arms taper downwardly from said cradle top toward said cradle bottom to define said wide reel receiving space.

27. The rod holder of claim 24 wherein said support cradle includes an adjustable mount mounting at least a first of said cradle arms in said support cradle so that a longitudinal distance between said cradle arms may be adjusted.

28. The rod holder of claim 27 wherein said adjustable mount includes a longitudinal adjustment mechanism for adjusting the longitudinal distance between said cradle arms, and a rotational adjustment element for adjusting a rotational position of said cradle arms.

29. The holder of claim 27 wherein said adjustable mount mounts said cradle arms on either a right side or a left side of said standard to provide a left-hand or a right-hand holder, respectively.

* * * * *